(12) United States Patent
Harnik et al.

(10) Patent No.: US 9,965,182 B2
(45) Date of Patent: May 8, 2018

(54) OPTIMIZATION OF DATA DEDUPLICATION

(71) Applicant: INTERNATIONAL BUSINESS MACHINES CORPORATION, Armonk, NY (US)

(72) Inventors: Danny Harnik, Tel Mond (IL); Ben Sasson, Yaffo (IL); Yosef Shatsky, Karnei Shomron (IL); Dmitry Sotnikov, Givataim (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 316 days.

(21) Appl. No.: 14/919,204

(22) Filed: Oct. 21, 2015

(65) Prior Publication Data

US 2017/0116229 A1    Apr. 27, 2017

(51) Int. Cl.
*G06F 17/30*    (2006.01)
*G06F 3/06*    (2006.01)

(52) U.S. Cl.
CPC .......... *G06F 3/06* (2013.01); *G06F 17/30159* (2013.01)

(58) Field of Classification Search
CPC combination set(s) only.
See application file for complete search history.

(56) References Cited

U.S. PATENT DOCUMENTS

| 8,103,590 | B2* | 1/2012 | Quoc .................... G06F 21/10 705/51 |
| 8,660,994 | B2 | 2/2014 | Slater et al. |
| 8,788,468 | B2 | 7/2014 | Amit et al. |
| 8,825,969 | B2 | 9/2014 | Gupta et al. |
| 2008/0140655 | A1* | 6/2008 | Hoos ................. G06F 17/30994 |
| 2009/0077071 | A1* | 3/2009 | Mishkanian ........ G06F 17/3064 |
| 2009/0157732 | A1* | 6/2009 | Hao ................... H04M 3/53325 |
| 2014/0006354 | A1 | 1/2014 | Parkison et al. |

* cited by examiner

*Primary Examiner* — Etienne Leroux
(74) *Attorney, Agent, or Firm* — Griffiths & Seaton PLLC (57) ABSTRACT

Various embodiments for optimizing deduplication in a computing storage environment by a processor. Links between data regions are intelligently formed, based on up-to-date popularity statistics, including a number of times a particular one of the data regions was a target for a potential link with another one of the data regions.

6 Claims, 4 Drawing Sheets

OPTIMIZATION OF DATA DEDUPLICATION

BACKGROUND OF THE INVENTION

Field of the Invention

The present invention relates in general computing systems, and more particularly to, various embodiments for optimizing data deduplication functionality in computing storage environments.

Description of the Related Art

In today's society, computer systems are commonplace. Computer systems may be found in the workplace, at home, or at school. Computer systems may include data storage systems, or disk storage systems, to process, store, and archive data. Large data archiving solutions typically use tape library systems where workstations and client devices are connected to one or more servers, and the servers are connected to one or more libraries. In data centers, such as those providing imaging for health care, entertainment, weather, military, and space exploration applications, these servers and libraries are often interconnected in a grid-computing environment. In such large scale computing environments, the minimization of duplicate data, or "deduplication," results in potentially significant benefits to the computer system, in terms of resource management and otherwise.

SUMMARY OF THE INVENTION

Various embodiments for optimizing deduplication in a computing storage environment by a processor are provided. In one embodiment, by way of example only, a method for optimizing deduplication in a computing storage environment by a processor is provided. Links between data regions are intelligently formed, based on up-to-date popularity statistics, including a number of times a particular one of the data regions was a target for a potential link with another one of the data regions.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Deduplication is a popular method for reducing storage capacities as well as bandwidth. The potential savings associated with deduplication are profound. For workloads with inherent repetitions, deduplication is reported to reduce capacity with ratios ranging between 1:2 and 1:20 in backup environments, and up to 1:10 in virtual machine environments.

Deduplication is typically achieved by splitting the incoming data into constant sized deduplication chunks (or simply "chunks") and computing a fingerprint on each chunk. Repeating chunks are then identified by lookups into a fingerprint database (DB) that stores the fingerprints of chunks in the system. When a repeating chunk is identified, the system aims to link the new incoming data to the existing data and avoid duplication. A principle challenge, however, is that forming this link is not always the desirable choice to make.

Avoiding duplications is essentially the goal of deduplication; however, there are circumstances under which the benefit of deduplication is minor, while the performance penalty is significant. Consider a storage system for which the amount of metadata is larger than can be fit in to memory and therefore metadata undergoes swapping. This is likely the case in storage platforms that support compression and deduplication. Assume that the swapping is achieved by dividing the data in to regions. The metadata of each region is either in memory or swapped out. Since deduplication spans regions, it can lead to excessive swapping of the metadata whenever reading a dedupe reference, leading to poor performance. This problem can be considerably mitigated by intelligently controlling link creation in such a way that reduces the amount of cross region links but only mildly affect the dedupe ratio.

A challenge in intelligently controlling this link creation is to decide whether or not creating a particular link will bring a significant value to the deduplication ratio. It is important not to establish this link in the case that the gain to the deduplication ratio is marginal, since creating a link comes with various costs.

These various costs include the following. First, the creation of every link adds additional metadata to be stored. Second, in some cases, the number of links is limited. Accordingly, choosing the wrong link will come at the expense of another link that may be significant to the end result. Third, the more metadata, the more management overhead that may be encountered. To wit, recovery processes may become longer; loading/dismissing the metadata becomes heavier; and garbage collection and defragmentation procedures take longer to complete.

There are several approaches to link management in existing deduplication systems. One approach involves the creation of a link each time a potential deduplication is found. In a subsequent optimization process, the cost-effectiveness of the link is validated, and acted upon. The downside to this approach is that deduplication is completed only after performing the optimization operation, which is not desirable, and sometimes not possible in systems that serve high load input/output (I/O) on a 24-hour, 7 days-a-week basis.

Additional approaches implement mechanisms from the realm of deduplication of backup streams that explore the tradeoff of deduplication versus read speeds. The crux in these approaches is to keep data as sequential as possible for optimal reads in disk based systems. A backup system with deduplication tends to develop fragmentation and hence slows the time it takes to perform recovery from the backup. The goal is to optimize for recovery of the latest stream.

One such backup stream mechanism moves data to newly formed backup streams. Another such backup stream mechanism declines deduplication opportunities when the opportunities are determined to be disruptive or not beneficial. These mechanisms are specialized to backup streams, and do not address the much lower deduplication locality exhibited in primary storage, however.

An alternative and novel approach, optimally, involves the creation of links that would be created only to the most popular regions. However, currently, this information is not readily available, and while the information may be retained online, would require a central popularity table in memory, which would consume limited memory space. In addition, deducing information regarding a link for the sole reason that another data segment decided to link to that particular data may not always be correct. This scenario may present itself where a piece of data may be relevant to a volume A, but not relevant to a volume B; or in another scenario where the owner of the data itself prefers to avoid carrying another reference in the system.

To address the challenges described previously in effective link management, and target the lower deduplication locality exhibited in primary storage, the mechanisms of the illustrated embodiments draws a novel approach, while still maintaining a high level of effectiveness. Among other aspects, and as will be further described, the mechanisms of the illustrated embodiments provide avenues for intelligent choice of the most appropriate links to be created between disk space regions for deduplication.

The mechanisms of the illustrated embodiments carry several important advantages, among other aspects, again as will be further described. The intelligent choice functionality is configured to be performed on an inline basis, alleviating any need for post processing operations. The functionality alleviates the aforementioned need to manage a central popularity database, thus reducing memory footprint and other resource consumption. Additionally, the functionality allows the owner of the particular data to control the links to the data itself. This is an important benefit when compared with other approaches, as this benefit allows for a new degree of decision making that could not be performed by other storage components, as those components lack the necessary information.

The mechanisms of the illustrated embodiments describe, among other aspects, a methodology of choice between which links to create between particular data regions based on the most up-to-date popularity statistics, as opposed to blind creation of those links. One point of novelty of these mechanisms is that the decision making may be performed by the owner region of the data itself, thus allowing the owner to take into account additional factors that may not be compiled otherwise. A destination region may also be configured to be responsible for deciding if creating another link (to the destination region itself) is cost-effective to the deduplication ratio, as well as to the overall system behavior in terms of metadata and system performance.

In one embodiment, each owner region is configured to manage a so-called "popularity index" that counts the number of times a potential link was created to the particular data by other data regions. As one of ordinary skill in the art will appreciate, this index may be created and maintained in memory only or persistent on storage. If the index will be managed in memory only, the index is rebuilt when the system restarts. The index may be configured in a variety of ways to suit a particular implementation.

In an additional embodiment, a system wide parameter is initialized describing the minimum popularity value per region that would indicate a popular owner. This initial value for the parameter may then be confirmed when testing the system. Based on additional logic, this global value may change over time.

In an additional embodiment, a potential referrer region will try to create a link to the owner region by searching the fingerprint database and obtaining the owner region, assuming a match is found. The owner region will decide if to accept the link or not, taking into account the following factors. First, the popularity of the owner region may be taken into account. The term "popularity," as described herein may refer to how many times this region was a target for a potential link with another data region, for example. Second, a variety of self-data management considerations may be taken into account. The owner region might decide to reject a link even if it is a very popular region. For example, the owner region may reject a link if the particular chunk is already referenced from some locations, but the owner wishes to discard the chunk himself because the data was already overwritten. In other words, the chunk is still valid but services foreign regions and not the region itself. In this case, allowing another link will further delay reducing the reference count to zero, bringing this region to manage foreign data for a longer period of time.

In still another embodiment, the potential referrer will create a link if it has the approval of the owner region, or will skip this deduplication opportunity and will write the data as is, in case the referrer gets a rejection from the owner region.

In an additional embodiment, any region (referring or owner), may implement a mechanism for reducing its respective popularity index, such as a decaying mechanism. These operations should be performed to ensure the system is full adaptive over time, and formerly popular regions will not continue to have new reference links created to them, at the expense of other, now better, candidates. As one of ordinary skill in the art will appreciate, a variety of decaying algorithms may be implemented to accomplish various aspects of this aforementioned decaying mechanism for the index.

Figure 1:
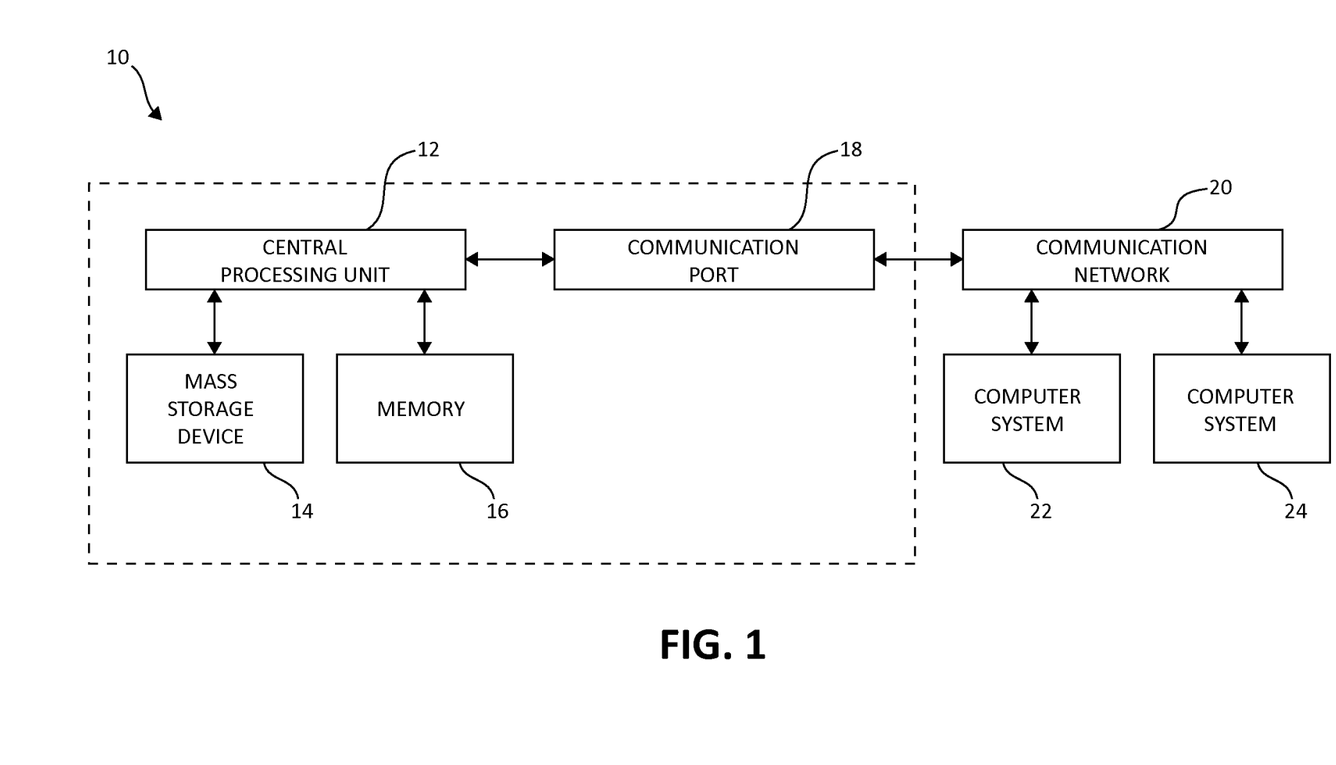
FIG. 1 is an exemplary block diagram showing a hardware structure for performing deduplication enhancement functionality, in which aspects of the present invention may be realized.

Turning now to the Figures, and first to FIG. 1, exemplary architecture 10 of a computing system environment is depicted. Architecture 10 may, in one embodiment, be implemented at least as part of a system for effecting mechanisms of the present invention. The computer system 10 includes at least one central processing unit (CPU) 12, which is connected to communication port 18 and memory device 16. The communication port 18 is in communication with a communication network 20. The communication network 20 may be configured to be in communication with systems 22, 24 and architecture 10, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere, and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12. As one of ordinary skill in the art will appreciate, a number of systems 10 may be configured in a connected and/or distributed way, physically located together or across a long geographically connected network, for example.

Figure 2:
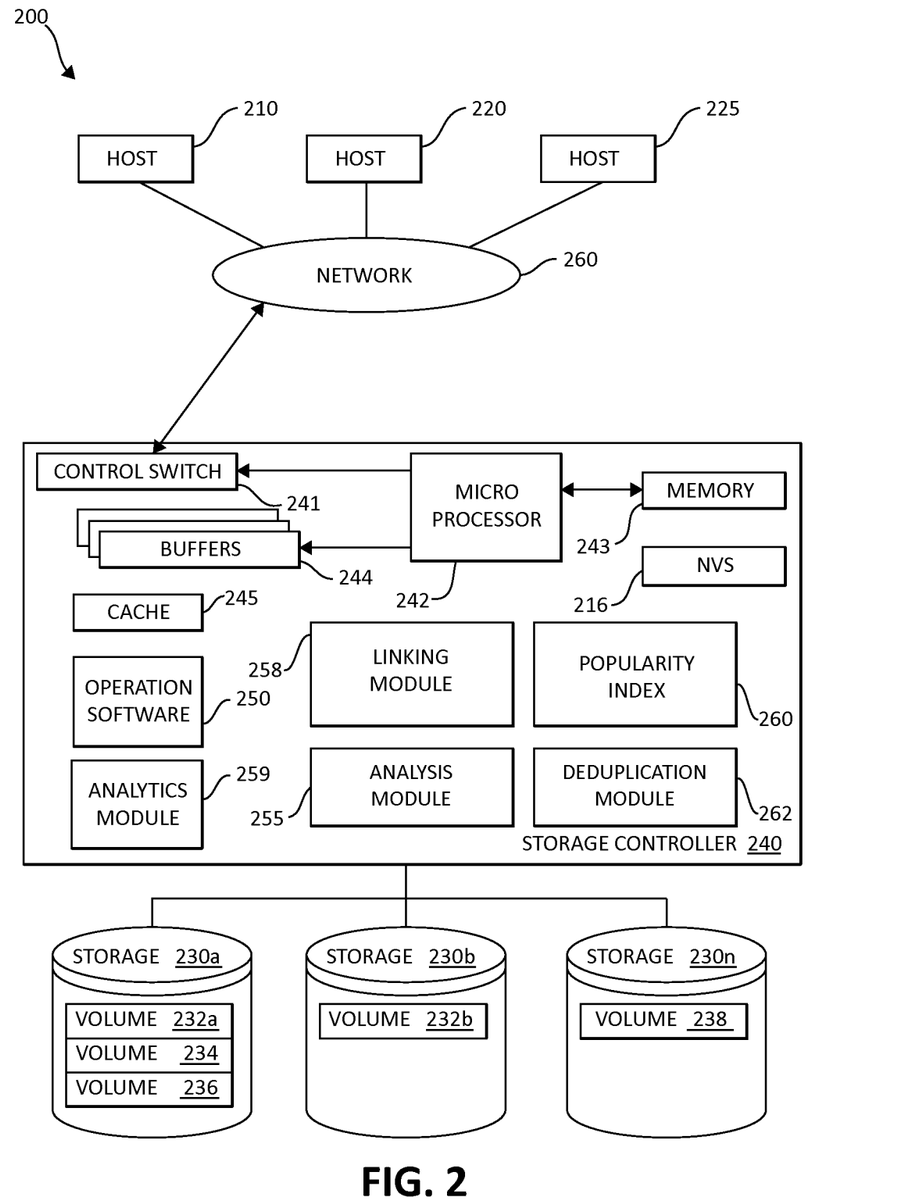
FIG. 2 is an exemplary block diagram showing a hardware structure of a data storage system in a computing storage environment, again in which aspects of the present invention may be realized.

FIG. 2 is an exemplary block diagram showing a hardware structure of a data storage system 200 that may be used in the overall context of performing functionality according to various aspects of the present invention. Data storage system may for example, in one embodiment, implement an enhanced object-based storage architecture as will be further described.

Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. Data storage system 200 may implement other functionality, such as that found in IBM® ProtecTIER® deduplication system TS7650G™, although one of ordinary skill in the art will recognize that a variety of deduplication, encryption, data processing, etc. hardware and software, separately or in combination, may be utilized to implement the functionality according to aspects of the illustrated embodiments.

Network connection 260 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes found in a distributed computing environment.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory," for buffering "write data" and "read data," which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230*n* is shown as being fully allocated to volume 238—that is, rank 230*n* refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a analysis module 255, a linking module 258, an analytics module 259, a popularity index 260, and a deduplication module 262 as shown. The analysis module 255, linking module 258, analytics module 259, and popularity index 260 may operate in conjunction with each and every component of the storage controller 240, the hosts 210, 220, 225, and storage devices 230. The analysis module 255, linking module 258, analytics module 259, and popularity index 260 may be structurally one complete module or may be associated and/or included with other individual modules. The analysis module 255, linking module 258, analytics module 259, and popularity index 260 may also be located in the cache 245 or other components, as one of ordinary skill in the art will appreciate.

The analysis module 255, linking module 258, analytics module 259, and popularity index 260 may individually and/or collectively perform various aspects of the present invention as will be further described. For example, the analysis module 255 may use analytics to identify, organize, create, delete or perform other actions on various data regions. The linking module 255 may create, maintain, and delete reference links between referrer data regions and owner data regions in accordance with aspects of the illustrated embodiments. The analytics module 259 may implement a decaying mechanism to dynamically adjust the popularity index 260 for a particular data region over time.

The popularity index 260 may be created, maintained, and deleted to reflect the popularity of a particular data region. In one embodiment, each owner region is responsible for the creation, maintenance, and other aspects of their respective popularity index 260. Deduplication module 262 may perform other deduplication-related functionality according to aspects of the illustrated embodiments. As one of ordinary skill in the art will appreciate, the analysis module 255, linking module 258, analytics module 259, and popularity index 260 may make up only a subset of various functional and/or functionally responsible entities in the data storage system 200.

Other ancillary hardware may be associated with the storage system 200. For example, as shown, the storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the tracking module, analysis module 258, reporting module 260, attribute repositories 262, or other blocks of functionality, in which information may be set. Multiple buffers 244 may be implemented with the present invention to assist with the operations as described herein.

Figure 3:
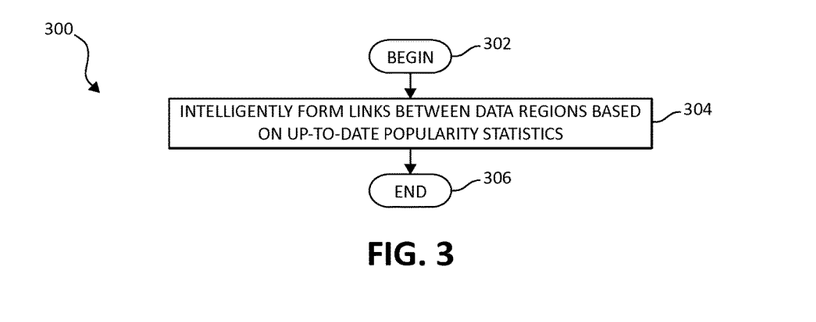
FIG. 3 is a flow chart diagram illustrating an exemplary method for optimizing deduplication in a computing storage environment by a processor, in accordance with various aspects of the present invention.

Turning now to FIG. 3, a flow chart diagram, illustrating an exemplary method 300 for optimization of lower deduplication locality using a processor, among other aspects of the illustrated embodiments, is depicted. Method 300 begins (step 302). Links between data regions are intelligently formed based on up-to-date popularity statistics (step 304). The method 300 then ends (step 306).

Figure 4:
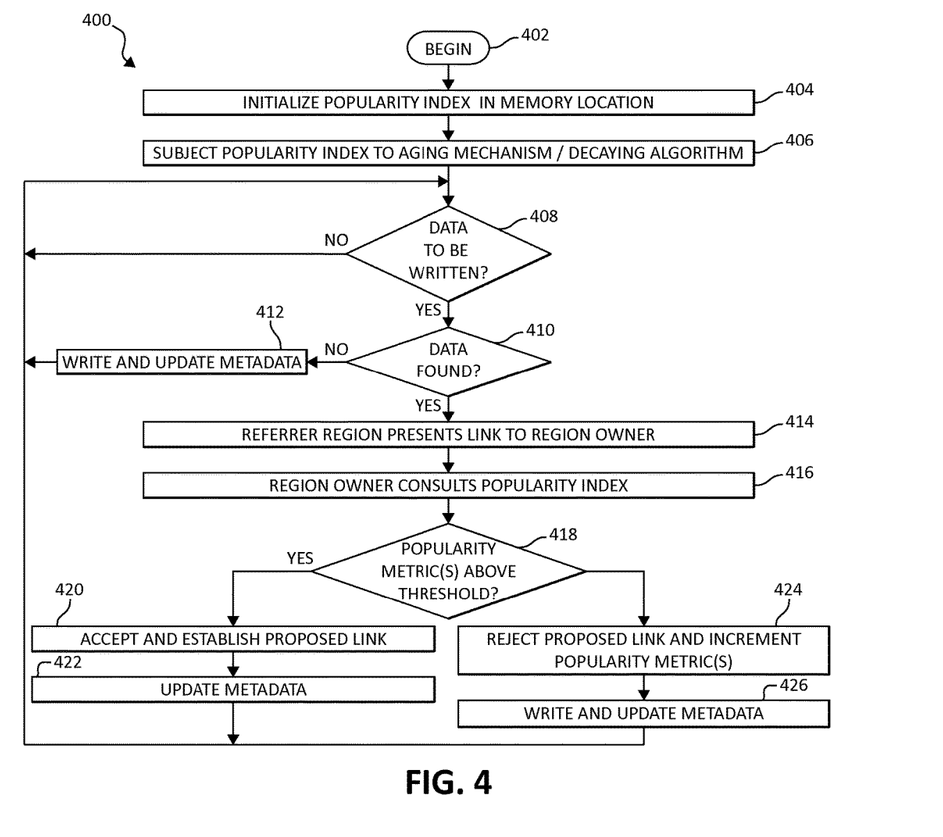
FIG. 4 is an additional flow chart diagram illustrating an additional exemplary method for optimizing deduplication in a computing storage environment by a processor, again in which aspects of the present invention may be implemented.

FIG. 4, following, illustrates an additional exemplary method 400 providing further exemplary detail for optimization of lower deduplication locality according to the present invention. Method 400 begins (step 402) with the initialization of a popularity index in some memory location by an owner region (step 404). As previously described, a popularity index may be created for every owner region in storage. The popularity index is then subjected to an aging mechanism/decaying algorithm to preserve the adaptive nature of the index over time (step 406).

The method 400 then queries if data is to be written (step 408). If no, the method 400 returns to step 408. If yes, the method 400 then queries if corresponding data is found (e.g., a referring data region locates the owner data region) (step 410). If no, the method 400 writes and updates the metadata for the particular data (step 412). The method 400 then returns to step 408 as shown.

Returning to step 410, if data is found, the referrer region presents a proposed link to the region owner (step 414), and the region owner consults the popularity index (step 416).

Continuing to decision step 418, if the popularity index analysis returns a value above a predetermined threshold, the owner region accepts and establishes the proposed link (step 420). The corresponding metadata is then updated (step 422) and the method 400 returns to step 408 and shown.

Returning to step 418, if the popularity index analysis returns a value below the predetermined threshold, the owner region rejects the proposed link, and increments popularity metrics associated with the data (step 424) in the popularity index. The data is then written, and corresponding metadata is updated (step 426). The method 400 then returns to step 408 as shown.

Figure 5:
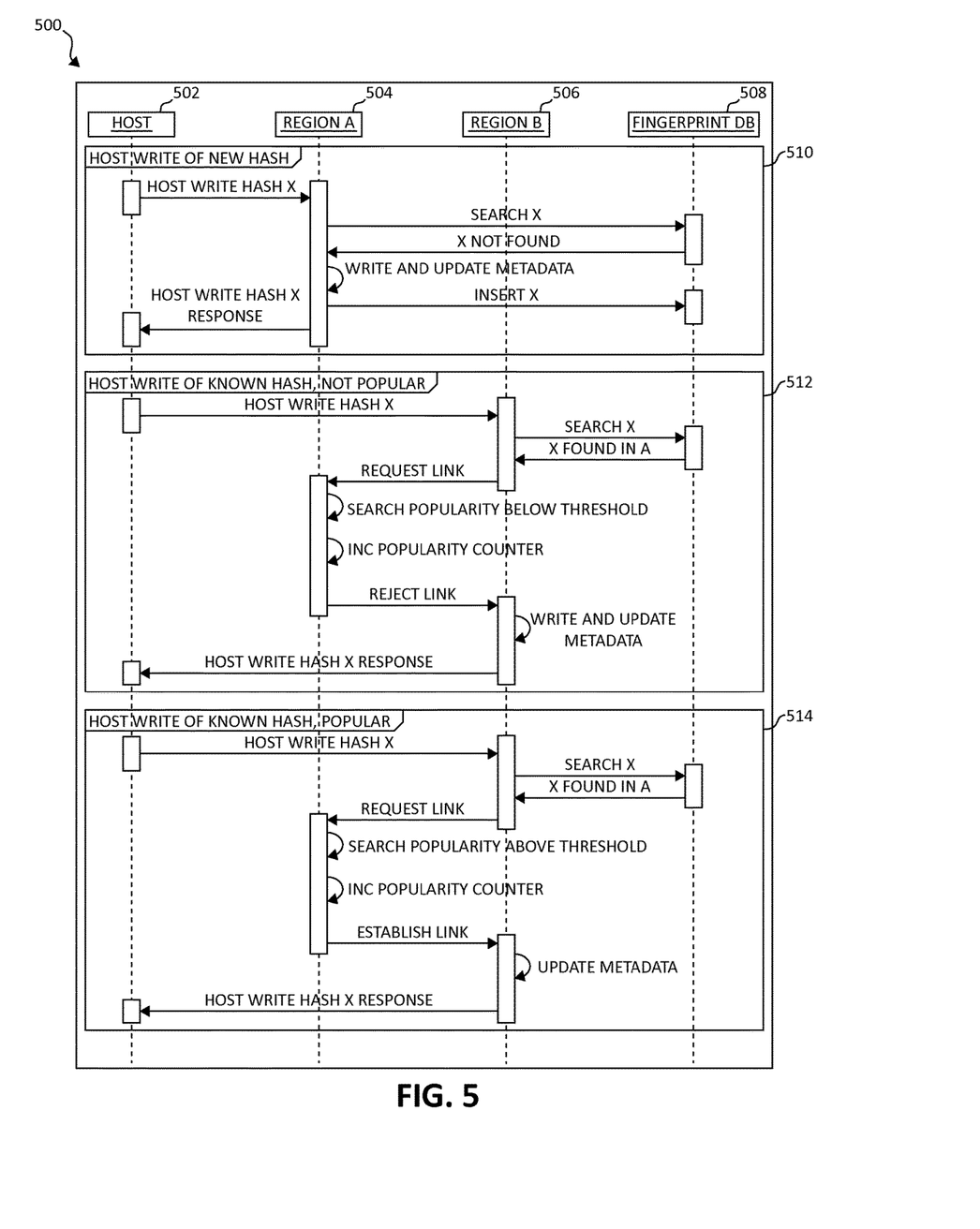
FIG. 5 is a block and flow diagram further illustrating various mechanisms for optimizing deduplication according to aspects of the present invention.

Turning now to FIG. 5, following, a block diagram illustration 500 of portions of exemplary functionality for optimizing lower deduplication locality, such as that previous depicted and described in FIG. 4 and method 400. FIG. 5 illustrates the various components of a storage system impacted in the mechanisms of the illustrated embodiments, such as a host 502, an owner data region (A) 504, a referring data region (B) 506, and a deduplication fingerprint database 508 as shown.

Blocks 510, 512, and 514 illustrate various exemplary scenarios of functionality as will be presently described. First, turning to block 510, on a host write of a hash X to storage, the hash X is searched in the fingerprint database 508. If X is not found, the corresponding metadata is written and updated, and X is inserted in the fingerprint database 508. The host write hash X acknowledgement is passed back to the host 502.

Turning to block 512, again on a host write of a hash X to storage, X is again searched in the fingerprint database 508 as shown, and X is found in region A (504). A link is requested by the referring data region B (506), and the owner region A (504) searches the popularity index corresponding to the data. The search returns a value below threshold, and the popularity counter is incremented for the index, and the link is rejected. The data region is then written and corresponding metadata is updated in region B (506), and the host write hash X acknowledgment is passed back to the host 502 as previously.

Turning now to block 514, again on a host write of a hash X to storage, X is again searched in the fingerprint database 508 as shown, and X is found in region A (504). A link is requested by the referring data region B (506), and the owner region A (504) searches the popularity index corresponding to the data. The search returned value is now above threshold, and the popularity counter is incremented in the index as shown. A link is established in and between the owner region A (504) and the referring region B (506), and corresponding metadata for the particular hash is updated. The host write hash X acknowledgment is passed back to the host 502 as previously.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for optimizing deduplication in a computing storage environment by a processor, comprising:
  intelligently forming links between data regions based on up-to-date popularity statistics, including a number of times a particular one of the data regions was a target for a potential link with another one of the data regions;
  managing, by an owner, a popularity index incorporating the popularity statistics, in one of a memory-only location and persistent memory location, wherein, over time, the popularity index is subjected to an aging mechanism pursuant to a decaying algorithm;
  creating, by a potential referrer one of the data regions to an owner one of the data regions, one of the intelligently formed links by searching the popularity index;
  deciding, by the owner one of the data regions, to accept the one of the intelligently formed links based on at least one of a plurality of predetermined factors; wherein deciding based on the at least one of the plurality of predetermined factors includes at least one of:
    considering a popularity metric of the owner one of the data regions, and
    considering at least one self-data management characteristic of the owner one of the data regions;
  if the one of the intelligently formed links is accepted by the owner one of the data regions, creating, by the potential referrer one of the data regions, the one of the intelligently formed links; and
  if the one of the intelligently formed links is rejected by the owner one of the data regions, writing data.

2. The method of claim 1, further including initializing a system-wide parameter describing a minimum popularity value per region to indicate a popular owner of a corresponding data region, wherein the minimum popularity value is confirmed when testing the computing storage environment.

3. A system for optimizing deduplication in a computing storage environment, comprising:
  at least one processor, operational in the computing storage environment, wherein the at least one processor intelligently forms links between data regions based on up-to-date popularity statistics, including a number of times a particular one of the data regions was a target for a potential link with another one of the data regions;
  manages, by an owner, a popularity index incorporating the popularity statistics, in one of a memory-only location and persistent memory location, wherein, over time, the popularity index is subjected to an aging mechanism pursuant to a decaying algorithm;
  creates, by a potential referrer one of the data regions to an owner one of the data regions, one of the intelligently formed links by searching the popularity index;
  decides, by the owner one of the data regions, to accept the one of the intelligently formed links based on at least one of a plurality of predetermined factors; wherein deciding based on the at least one of the plurality of predetermined factors includes at least one of:
    considering a popularity metric of the owner one of the data regions, and
    considering at least one self-data management characteristic of the owner one of the data regions;
  if the one of the intelligently formed links is accepted by the owner one of the data regions, creates, by the potential referrer one of the data regions, the one of the intelligently formed links; and
  if the one of the intelligently formed links is rejected by the owner one of the data regions, writes data.

4. The system of claim 3, wherein the at least one processor initializes a system-wide parameter describing a minimum popularity value per region to indicate a popular owner of a corresponding data region, further wherein the minimum popularity value is confirmed when testing the computing storage environment.

5. A computer program product for optimizing deduplication in a computing storage environment by a processor, the computer program product comprising a non-transitory computer-readable storage medium having computer-readable program code portions stored therein, the computer-readable program code portions comprising:
  a first executable portion that intelligently forms links between data regions based on up-to-date popularity statistics, including a number of times a particular one of the data regions was a target for a potential link with another one of the data regions;
  a second executable portion that manages, by an owner, a popularity index incorporating the popularity statistics, in one of a memory-only location and persistent memory location, wherein, over time, the popularity index is subjected to an aging mechanism pursuant to a decaying algorithm;
  a third executable portion that creates, by a potential referrer one of the data regions to an owner one of the data regions, one of the intelligently formed links by searching the popularity index;
  a fourth executable portion that decides, by the owner one of the data regions, to accept the one of the intelligently formed links based on at least one of a plurality of predetermined factors; wherein deciding based on the at least one of the plurality of predetermined factors includes at least one of:
    considering a popularity metric of the owner one of the data regions, and
    considering at least one self-data management characteristic of the owner one of the data regions;
  a fifth executable portion that, if the one of the intelligently formed links is accepted by the owner one of the data regions, creates, by the potential referrer one of the data regions, the one of the intelligently formed links; and
  a sixth executable portion that, if the one of the intelligently formed links is rejected by the owner one of the data regions, writes data.

6. The computer program product of claim 5, further including a seventh executable portion that initializes a system-wide parameter describing a minimum popularity value per region to indicate a popular owner of a corresponding data region, further wherein the minimum popularity value is confirmed when testing the computing storage environment.

* * * * *